Aug. 31, 1948.    F. A. FIRESTONE ET AL    2,448,363
TIME MARKS FOR THE SWEEP OF CATHODE RAY TUBES
Filed June 28, 1945
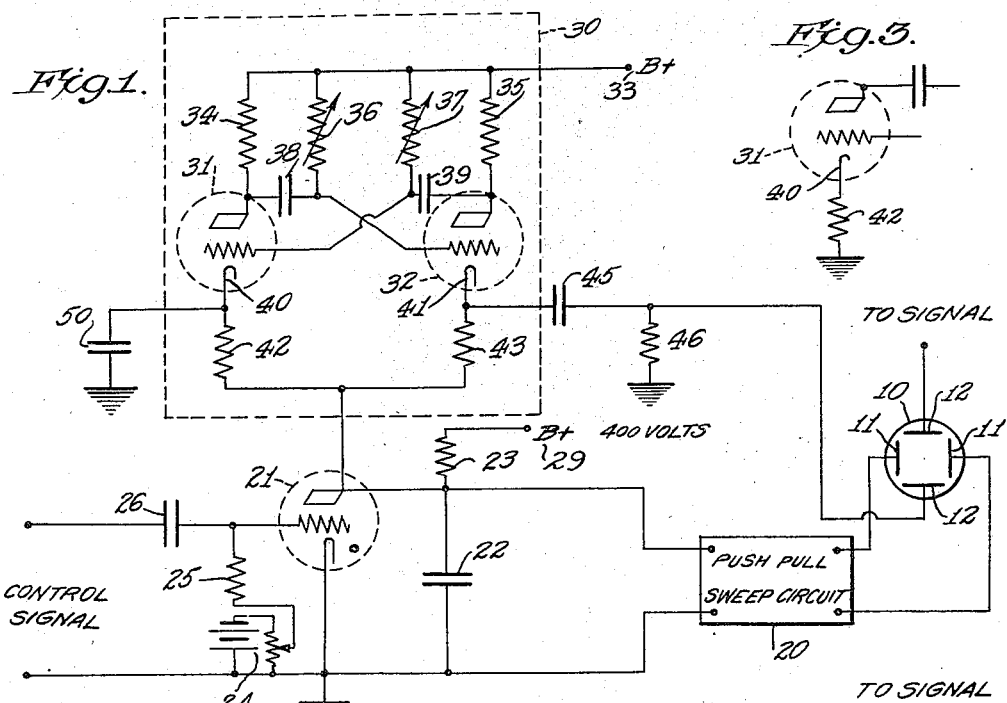
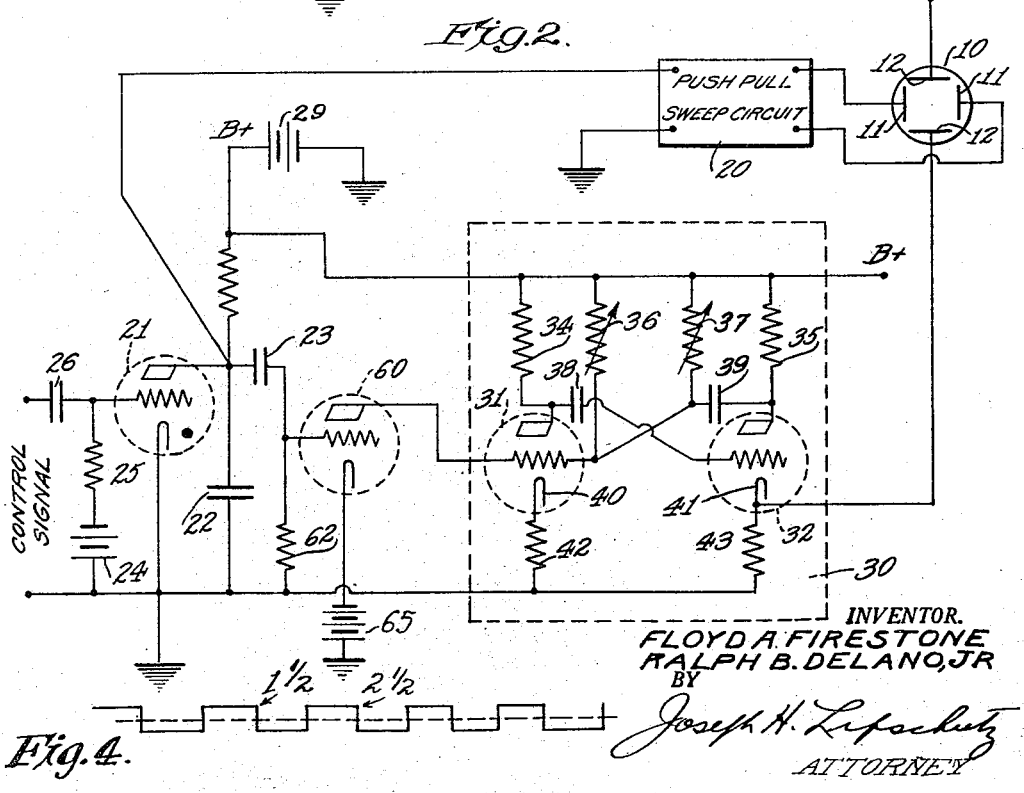
INVENTOR.
FLOYD A. FIRESTONE
RALPH B. DELANO, JR
BY
Joseph H. Lipschutz
ATTORNEY Patented Aug. 31, 1948

2,448,363

UNITED STATES PATENT OFFICE 2,448,363

TIME MARKS FOR THE SWEEP OF CATHODE-RAY TUBES

Floyd A. Firestone, Ann Arbor, Mich., and Ralph B. De Lano, Jr., New York, N. Y., assignors to Sperry Products, Inc., Hoboken, N. J., a corporation of New York Application June 28, 1945, Serial No. 602,100

11 Claims. (Cl. 315—24)

1

This invention relates to apparatus for introducing time marks into the sweep of a cathode ray tube or oscilloscope so that the time between signals indicated on the oscilloscope may be measured by reference to these marks. It is one of the principal objects of this invention to provide a simple method and means for introducing such time marks into the sweep of a cathode ray tube.

It is a further object of this invention to provide a method and means for synchronizing the sweep and the time marking means by causing the initiation of the sweep to render the time marking means effective.

It is a further object of this invention to provide a square wave form for the time marks, such wave form being visible even in the presence of a signal of large amplitude. Such time marks are also a quick and ready indication of time since, for example, if the positive portion equals the negative portion and each cycle is one-millionth of a second, then the end of each square portion represents one-half millionth of a second.

Further objects and advantages of this invention will become apparent in the following detailed description thereof.

In the accompanying drawings,

Fig. 1 is a wiring diagram illustrating one embodiment of this invention.

Fig. 2 is a view similar to Fig. 1 illustrating another form of this invention.

Fig. 3 is a view of a portion of Fig. 2 showing a modified form of the invention.

Fig. 4 is a representation of the time marks as they appear on the oscilloscope.

Referring to Fig. 1, there is disclosed a cathode ray tube or oscilloscope 10 having sets of deflecting means which may take the form of horizontal plates 11 and vertical plates 12. The horizontal plates control the horizontal sweep while the vertical plates introduce the time marks and the signal which it is desired to indicate.

The horizontal sweep may be controlled by a push-pull sweep circuit 20 which in turn is controlled by a circuit including a breakdown device 21 which may be an R. C. A. type 884 gas discharge tube. Said tube is normally shunted across a condenser 22 which is charged through a resistor 23 to a potential of, for example, 400 volts. The grid of tube 21 is normally biased sufficiently negative by means of battery 24 acting through grid leak 25 so that tube 21 does not conduct current. The said tube may be caused to conduct current either in response to a control signal which may be, for example, a wave

2 train emitted from a wave train generator as disclosed in the patent to Firestone No. 2,280,226 granted April 21, 1942, or it may be caused to discharge periodically. In the case where the discharge of tube 21 is controlled by the input signal, said signal is caused to impress a positive voltage through condenser 26 on the grid of tube 21 so that said grid becomes less negative to a sufficient degree to permit the tube to become suddenly conducting and to discharge condenser 22. The push-pull sweep circuit 20 is thus energized to place the necessary voltage upon plates 11 of tube 10, and cause a horizontal sweep of the cathode ray beam across the face of the tube. In the case where no input signal is used for controlling the discharge of tube 21, such discharge may be effected periodically by so choosing the potential of battery 24 that the tube 21 will discharge repeatedly as condenser 22 recharges to a predetermined voltage and, hence, as the plate of tube 21 reaches said predetermined voltage.

By the discharge of tube 21, a saw-tooth wave is generated suitable for operation through the push-pull circuit 20 to produce a horizontal sweep of the cathode ray tube 10.

For introducing time marks on the horizontal sweep so that the time interval between indicated signals can be indicated, we employ a multivibrator indicated generally at 30. Such multivibrator may be of known type and comprise two tubes 31 and 32. The plate voltage for the plates of the tubes may be obtained from a B battery 33 supplying, for example, 300 volts through resistors 34 and 35. The grid bias may be supplied through resistors 36 and 37. The tubes are connected so that the output of one tube feeds by way of a condenser 38 to the grid of the other tube while the output of the second tube feeds by way of condenser 39 to the grid of the first tube. Thus, if the cathodes 40 and 41 of the tubes are grounded, the multivibrator would operate continuously, the discharge of one tube energizing the other tube.

By connecting the cathode 41 to the vertical plate 12 of the cathode ray oscilloscope 10, a vertical component will be introduced in the horizontal sweep each time the tube 32 passes current. The cathode of tube 31 is not connected to the vertical plate 12 and therefore periodic spaced time marks will be introduced in the horizontal sweep. Low frequency components may be filtered from the volume delivered from tube 32 by means of a filter comprising condenser 45 and resistor 46.

In the present case it is not desired that the multivibrator vibrate continuously, but rather it is desired that the multivibrator be synchronized with the horizontal sweep. Since the breakdown of tube 21 initiates the horizontal sweep, this factor is also utilized to render the multivibrator effective and thus introduce the time marks on the horizontal sweep in fixed predetermined relation to the horizontal sweep because the time marks are initiated by the same control element, namely, gaseous discharge tube 21 which controls the horizontal sweep. The means for effecting such control and synchronization are as follows: The lower ends of resistors 42 and 43 in the circuit of the cathodes of tubes 31 and 32 are connected to the plate of tube 21. When condenser 22 is fully charged from the B+ source the cathodes of tubes 31 and 32 will be at a higher potential than their plates, since in the case here chosen for illustration the battery 29 has a voltage of 400 while the battery 33 has a voltage of 300. Hence, no current will pass through tubes 31 and 32 and the multivibrator will not oscillate. Upon the sudden discharge of condenser 22, however, when tube 21 becomes conducting, the potential on the cathodes of tubes 31 and 32 drops to near zero, and the multivibrator starts to oscillate. By placing a small condenser 50 between the cathode of tube 31 and ground, the multivibrator will always start oscillation in the same phase because tube 31 will be delayed in acting due to the voltage which the condenser applies to the cathode. Hence, oscillation of the vibrator will aways begin with the tube 32 becoming effective as soon as tube 21 breaks down. The same result can be obtained by connecting the lower end of resistor 42 directly to ground, as shown in Fig. 3, making this tube continuously conducting. Vibration will therefore always start with tube 31. Since the output of tube 21 is of square wave form, the time mark will always be of square wave form. This is highly desirable because such time marks will be visible even in the presence of a signal of large amplitude whereas heretofore the small, peaked time marks tended to be lost or become undistinguishable when the impressed signal on the cathode tube was of large amplitude. The signal which it is desired to indicate in relation to the time marks is shown impressed on the vertical plates 12 of the cathode ray oscilloscope.

The length of the time signal provided by the multivibrator can be controlled by regulating the constants of the multivibrator circuit. By adjusting resistors 36 and 37 the positive portion of each cycle of the multivibrator can be made to bear any desired relation to the negative portion. Under most circumstances it will be found convenient to so adjust the resistors 37, 38 that the positive and negative portions of each cycle are equal so that there will be obtained, as shown in Fig. 4, a square wave output in which the portion above the normal sweep base line, as indicated by the dotted line, is equal to the portion below the base line. This means that the time which a full cycle indicates can be readily read on the oscilloscope merely by counting the portions either above or below the line. Thus two square wave portions above the line indicate the passage of 1½ time units. If the complete cycle represents one-millionth of a second, then by merely counting the number of rectangles above the line the number of half-millionths of a second can readily be determined. The constants of the multivibrator circuit are such as to give a frequency which will yield a plurality of cycles of output from the multivibrator for each sweep between horizontal plates 11.

By the above arrangement it becomes apparent that the time signals are introduced into the sweep of the oscilloscope in synchronized relation with the sweep. In other words, the time signal will always appear at the same points in the sweep and only when the sweep occurs, since the time marks are controlled by the sweep.

In a modified form of the invention disclosed in Fig. 2, the connection between the gaseous discharge tube 21 and the multivibrator 30 is made through a control tube 60 instead of through cathode resistors 42 and 43. In this form of the invention the lower side of cathode resistors 42 and 43 are permanently grounded. The additional tube 60 which couples the tube 21 with the multivibrator has a grid which is grounded through a grid leak 62 and a plate which is connected to the grid of tube 31 of the multivibrator. The cathode of tube 60 is connected to the negative end of a grounded battery 65. Thus, with the system standing in its normal state, the plate of tube 60 is at a negative potential with respect to ground approximately equal to the negative potential supplied by battery 65 and this negative potential is applied to the grid of tube 31. Tube 31 is therefore biased beyond cut-off and the multivibrator does not operate. Upon the sudden discharge of condenser 22 however the grid of tube 60 receives a negative pulse which carries that tube beyond cut-off, tube 60 ceases to conduct and the grid of tube 31 becomes less negative to an extent which permits operation of the multivibrator. Thus, the time signals are again introduced into the oscilloscope 10 each time tube 21 discharges and, therefore, each time the sweep circuit 20 is energized. Consequently the time marks are synchronized with the sweep and occur only when the sweep occurs.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described our invention, what we claim and desire to secured by Letters Patent is:

1. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective, and means controlled by said critical voltage breakdown device for rendering said multivibrator effective.

2. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, and means controlled by said critical voltage breakdown device for rendering said multivibrator effective and ineffective.

3. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, said multivibrator comprising a pair of electron tubes each having plate, grid and cathode, means for applying a voltage to the plate of the device, means for applying a voltage to the cathode of one of the tubes normally higher than its plate voltage so that the tube is non-conducting and the multivibrator is ineffective, the cathode of the other of the tubes being connected to ground so that the multivibrator when rendered effective will aways become operative in the same phase, and means whereby the breakdown of said device lowers the cathode voltage of the first tube to render said tube conducting and the multivibrator effective.

4. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, said multivibrator comprising a pair of electron tubes each having plate, grid and cathode, means for applying a voltage to the plate of the device, means for applying a voltage to the cathode normally higher than the plate voltages so that the tubes are non-conducting and the multivibrator is ineffective, and means whereby the breakdown of said device lowers the cathode voltage of the tubes to render the tubes conducting and the multivibrator effective.

5. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, said multivibrator comprising a pair of electron tubes each having plate, grid and cathode, means for applying a voltage to the plate of the device, means for applying a voltage to the cathode normally higher than the plate voltages so that the tubes are non-conducting and the multivibrator is ineffective, means whereby the breakdown of said device lowers the cathode voltage of the tubes to render the tubes conducting and the multivibrator effective, and means for delaying lowering of the cathode voltage of one of the tubes so that the multivibrator will always be rendered effective in the same phase.

6. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, said multivibrator comprising a pair of electron tubes each having plate, grid and cathode, means for applying a voltage to the plate of the device, means for applying a voltage to the cathode normally higher than the plate voltage so that the tubes are non-conducting and the multivibrator is ineffective, and means whereby the breakdown of said device lowers the cathode voltage of the tubes to render the tubes conducting and the multivibrator effective, one of the tubes being connected to the second named set of deflecting means, the other tube having a condenser in the cathode circuit thereof so that the multivibrator will always be rendered effective in the same phase.

7. In combination, an oscilloscope having horizontal and vertical sets of deflecting means, a sweep circuit connected to one set of deflecting means, a multivibrator connected to the other set of deflecting means, means including a critical voltage breakdown device for rendering said sweep circuit effective and ineffective, said multivibrator comprising a pair of electron tubes each having plate, grid and cathode, means including an electron tube inter-connecting said critical voltage breakdown device and the grid of one tube of the multivibrator, means whereby said interconnecting tube places a cutoff potential on said last-named grid, and means whereby the breakdown of said device causes said connecting tube to render said last-named grid less negative to render said multivibrator effective.

8. In combination, an oscilloscope having horizontal and vertical sets of deflecting means, a sweep circuit connected to one set of deflecting means, a multivibrator, means for rendering said sweep circuit effective to provide a sweep, means controlled by said last-named means for rendering said multivibrator effective, means for periodically producing a plurality of cycles of the multivibrator for each sweep, and means for applying the output of the multivibrator to the other set of deflecting means whereby each cycle of the multivibrator varies the sweep.

9. In combination, an oscilloscope having horizontal and vertical sets of deflecting means, a sweep circuit connected to one set of deflecting means, a multivibrator, means for rendering said sweep circuit effective to provide a sweep, means controlled by said last-named means for rendering said multivibrator effective, means for periodically producing a plurality of cycles of the multivibrator for each sweep, and means for applying to the other set of deflecting plates voltages similar to the output voltages of the multivibrator.

10. In combination, an oscilloscope having horizontal and vertical sets of deflecting means, a sweep circuit connected to one set of deflecting means, a multivibrator, means for rendering said sweep circuit effective to provide a sweep, means controlled by said last-named means for rendering said multivibrator effective, means for periodically producing a plurality of cycles of the multivibrator for each sweep, and means for applying to the other set of deflecting plates alternating voltages corresponding to the output voltages of the multivibrator.

11. In combination, an oscilloscope having horizontal and vertical sets of deflecting means, a sweep circuit connected to one set of deflecting means, a multivibrator, means for rendering said sweep circuit effective to provide a sweep, means controlled by said last-named means for rendering said multivibator effective, means for periodically producing a plurality of cycles of the multivibrator for each sweep, and means for applying to the other set of deflecting plates alternating voltages corresponding to the output voltages of the multivibrator wherein the positive and negative portions of each alternation are of equal duration.

FLOYD A. FIRESTONE.
RALPH B. DE LANO, Jr.

(References on following page)

REFERENCES CITED

The following references are of record in the file of this patent:

UNITED STATES PATENTS

| Number | Name | Date |
|---|---|---|
| 2,293,135 | Hallmark | Aug. 18, 1942 |
| 2,300,999 | Williams | Nov. 3, 1942 |
| 2,368,449 | Cook | Jan. 30, 1945 |
| 2,405,238 | Seeley | Aug. 6, 1946 |
| 2,420,516 | Bischoff | May 13, 1947 |

OTHER REFERENCES

Sherman, "The Generation for Television of Horizontal Synchronizing Pulses," Proceedings of the I. R. E., Sept. 1940, pages 406 and 409.